United States Patent [19]
Balzeit et al.

[11] Patent Number: 5,369,425
[45] Date of Patent: Nov. 29, 1994

[54] DEVICE FOR AUTOMATICALLY CLAMPING AND RELEASING RECORDING MATERIAL AND OPERATION OF SAID DEVICE

[75] Inventors: Ralf Balzeit, Preetz; Gunnar Behrens, Kiel Russee; Gerhard Bloehdorn, Schoenkirchen; Bernd Lassen, Moenkeberg; Hans Penza, Preetz; Norbert Roth, Kiel, all of Germany

[73] Assignee: Linotype-Hell AG, Kiel, Germany

[21] Appl. No.: 834,576

[22] PCT Filed: Aug. 8, 1990

[86] PCT No.: PCT/DE90/00615
§ 371 Date: Feb. 18, 1992
§ 102(e) Date: Feb. 18, 1992

[87] PCT Pub. No.: WO91/03121
PCT Pub. Date: Mar. 7, 1991

[30] Foreign Application Priority Data
Aug. 17, 1989 [DE] Germany ............... 3927162

[51] Int. Cl.$^5$ ............................................. G01D 15/24
[52] U.S. Cl. ................................... 346/138; 271/196; 271/276; 346/134; 346/136; 346/76 L; 346/24; 355/73
[58] Field of Search ............... 346/24, 134, 136, 138, 346/76 L; 271/194, 196, 276, 195; 355/29, 73, 310, 312; 226/90

[56] References Cited

U.S. PATENT DOCUMENTS

| | | |
|---|---|---|
| 3,343,173 | 9/1967 | Cooley ....................... 346/24 |
| 3,722,999 | 3/1973 | Cunha et al. .............. 355/72 X |
| 3,813,682 | 5/1974 | Nishikawa et al. ........ 95/31 R |
| 3,908,981 | 9/1975 | Naroff ....................... 271/3 |
| 4,052,731 | 10/1977 | Powers ...................... 354/275 |
| 4,252,307 | 2/1981 | Korte ........................ 271/195 X |
| 4,268,841 | 5/1981 | Fujii et al. ................ 346/138 |
| 4,330,798 | 5/1982 | Heyer et al. .............. 358/291 |
| 4,527,320 | 7/1985 | Deconinck ................ 29/33 R |
| 4,605,300 | 8/1973 | Thaddey ................... 355/29 |
| 4,733,309 | 3/1988 | Mori et al. ................ 358/289 |
| 4,777,509 | 10/1988 | Komatsubara et al. ..... 271/194 X |
| 4,786,946 | 11/1988 | Jessop ....................... 355/28 |
| 4,928,897 | 5/1990 | Satou et al. ............... 226/90 X |

FOREIGN PATENT DOCUMENTS

| | | | |
|---|---|---|---|
| 2023390 | 5/1970 | Germany | G03B 1/02 |
| 1474973 | 8/1970 | Germany | B65H 17/18 |
| 2209515 | 2/1975 | Germany | G03B 27/52 |
| 2804136 | 3/1979 | Germany | G03B 17/26 |
| 3120172A1 | 12/1982 | Germany | G03B 27/60 |
| 3230676A1 | 3/1983 | Germany | H04N 1/08 |
| 3303476A1 | 8/1984 | Germany | G03B 27/30 |
| 3615703A1 | 11/1987 | Germany | G03B 1/32 |
| 3744002A1 | 7/1989 | Germany | G03B 1/58 |
| 61-170179 | 6/1986 | Japan | H04N 1/08 |
| 170179 | 7/1986 | Japan . | |
| 2183605 | 6/1987 | United Kingdom | B65H 20/00 |

Primary Examiner—Benjamin R. Fuller
Assistant Examiner—J. E. Barlow, Jr.
Attorney, Agent, or Firm—Hill, Steadman & Simpson

[57] ABSTRACT

An apparatus and method for automatically clamping film material onto the recording drum of a reproduction device and for releasing the film material exposed by a recording element from the recording drum. The apparatus has a roll film cassette introducible into a light tight portion of the reproduction device. Conveyor and guide surfaces are provided between the roll film cassette and the recording drum. Film conveying means is provided for conveying the film web situated in the roll film cassette to the recording drum. A film cutting means is provided for the separation of film sheets. A film length measuring means, a pressure means having a lowerable pressure roller for the film sheets, a positioning drive for turning the recording drum into a start of clamping, start of exposure and start of release position, and a lift-off means having a lowerable lift-off finger for peeling the exposed film sheets from the recording drum are all provided. The film sheets are fixed on the recording drum by vacuum. Large-area film material from a roll film cassette can be clamped onto the recording drum with this apparatus without the formation of folds and without warping.

15 Claims, 7 Drawing Sheets

DEVICE FOR AUTOMATICALLY CLAMPING AND RELEASING RECORDING MATERIAL AND OPERATION OF SAID DEVICE

BACKGROUND OF THE INVENTION

The invention is in the field of electronic reproduction technology and is directed to a device and to the operation thereof for automatically clamping film material onto the recording drum of a reproduction apparatus and for releasing the film material exposed by a recording element from the recording drum. In particular, the reproduction apparatus is a color scanner or color recorder.

In reproduction technology, color separations for multi-color printing are produced with color scanners or color recorders. To that end, color signals are first acquired by optoelectronic, trichromatic scanning of a chromatic original and these color signals are converted into color separation signals by a color correction. Sheet-shaped film materials, also referred to as film proofs or film sheets, are clamped on a recording drum of the color scanner or color recorder and are exposed point-by-point and line-by-line by a recording element that is modulated in brightness by the color separation signals. The exposed film proofs are released from the recording drum and are developed. The developed film proofs are the color separations for the multi-color printing.

The film proofs to be exposed and having different formats can already be present in the form of sheet film material that is taken from a sheet film cassette for clamping or that is cut-off from roll film material situated in a roll film cassette before the clamping.

In traditional color scanners or color recorders, the film proofs to be exposed are manually clamped onto the recording drum and are fixed thereat either with adhesive tape or with a vacuum suction.

It is required for an effective and economical use of a color scanner or color recorder to enhance the efficiency, particularly by shortening the preparation and adjustment times at the color scanner as compared to the times required for the actual film exposure. The preparation and adjustment times, for example, can be reduced in that the optimum adjustment parameters for a good reproduction are calculated by an operator in a prior process on the basis of work preparation devices (AV devices) and are stored and are then transferred into the color scanner in a short time immediately before the film exposure. At the same time, as many work steps as possible that are to be normally executed by the operator must be automated, for example the clamping and releasing of the film proofs onto or, respectively, from the recording drum.

In what are referred to as bright room devices, i.e. devices that do not work in dark rooms but under day light, it must also be taken into consideration that the removal of the film material from the supply cassette, the conveying thereof to the recording drum and the clamping and release must occur under exclusion of light.

German Patent 22 09 515 already discloses a device for clamping and releasing sheet-shaped film proofs onto or, respectively, from the recording drum of a color scanner. The film proofs to be exposed, which are provided with registration perforations and are situated in a sheet film cassette, have their registration perforations hooked over the registration pins situated on the recording drum on the basis of a manually actuatable roller and lever mechanism, are pulled from the sheet film cassette by turning the recording drum and are fixed on the recording drum by vacuum. After the exposure, the film proofs are lifted off from the drum surface by the roller and lever mechanism and are conveyed back into the sheet film cassette.

The device disclosed by German Patent 22 09 515 has the disadvantage that only film proofs provided with registration perforations and having given formats can be clamped and that the clamping and release can only occur with the collaboration of the operator.

US-A-4,268,841 discloses another electronic reproduction device that already comprises a means for automatically clamping sheet-shaped recording material on a recording drum, for vacuum suctioning of the recording material against the recording drum, and for automatically releasing the exposed recording material from the recording drum. The sheet-shaped recording material is automatically conveyed from a supply station via a conveyor means to the recording drum, is wound around the recording drum with the assistance of an annular channel between drum surface and housing wall and is fixed thereat by the vacuum suctioning. After the exposure, the recording material is likewise automatically released from the recording drum and is supplied to a discharge opening in the device for further processing.

The device disclosed by U.S. Pat. No. 4,268,841 likewise has the disadvantage that only sheet-shaped recording material can be clamped and released and that no specific measures are recited that guarantee a friction-free, automatic execution of the clamping and releasing.

DE-A-32 30 676 discloses a vacuum clamping means that employs a combination of pneumatic and mechanical components for fixing sheet-shaped recording material on a recording drum.

What is achieved by adding individual groups of suction holes or rows of suction holes is that recording material of different formats can be clamped without great vacuum losses. Means for controlling the valves and for conveying the recording material to or from the recording drum are not recited.

The device disclosed by DE-A-32 30 676 thus had the disadvantage that the feed of the sheet-shaped recording material must occur manually and that the switching of the groups or rows of suction holes does not occur automatically, dependent on the clamping and releasing event and/or on the respective format of the recording material to be clamped.

The tendency in reproduction technology is toward the employment of unperforated roll film material and to cut off the respectively required film lengths from the roll film material and to clamp it. Added thereto is the desire to be able to clamp and release arbitrary formats. Practice has shown that it is difficult to manually clamp, in particular, large-format film proofs onto the recording drum exactly and fold-free. The exact and smooth clamping of the film proofs, however, is an indispensable prerequisite for the exposure of exactly registered color separations and for the production of qualitatively high-grade multi-color prints.

SUMMARY OF THE INVENTION

An object of the invention is therefore to specify a device and an operation thereof for the automatic clamping and release of unperforated recording material onto or, respectively, from the recording drum of a reproduction apparatus, this guaranteeing a reliable and smooth clamping and a reliable release of, in particular, large-area film material, so that a friction-free work execution and a high production quality are achieved.

According to the apparatus and method of the invention for automatically clamping a web of film onto a recording drum of a reproduction device and for releasing the film recorded by a recording element from the recording drum, the recording drum is situated in a substantially light-tight space of the reproduction device. A roll film cassette is provided that contains the film as a rotatable film roll and which is provided with a slot-shaped film passage opening, light sealing means associated with the opening providing a substantially light-tight environment in the cassette. The roll film cassette is positioned for introduction into the light-tight space and is lockable there. The film passage opening is positioned to open toward the recording drum and has a longitudinal extent which is parallel to an axis of the recording drum. A conveying and guide surface means is arranged between the film passage opening and the recording drum for receiving the film web unwound from the film roll and for positioning the unwound film substantially tangent relative to the recording drum. Film conveying means conveys the film web out of the roll film cassette into the recording drum. Film cutting means is arranged between the roll film cassette and the recording drum for cutting a film sheet of a prescribed length from the film web to be respectively exposed. A film length measuring means is arranged between the roll film cassette and the recording drum for identifying a length of the film web that has respectively passed through. Pressure means comprising a pressure roller which is pivotable against the recording drum is provided at a region where a start of the film web conveyed to the recording drum comes into contact with the drum surface. A positioning drive means turns the recording drum into start of clamping, start of exposure, and start of release positions. A lift-off means comprising a lift-off finger pivotable against the recording drum is provided for peeling a respectively exposed sheet of film from the recording drum. Rows of section holes are located in a generated surface of the recording drum and which proceed axially vis-a-vis the drum axis and which are connected to a vacuum pump means for vacuum fixing of the film sheet on the recording drum.

The invention shall be set forth in greater detail below with reference to FIGS. 1 through 7.

DESCRIPTION OF THE PREFERRED EMBODIMENTS

Figure 1:
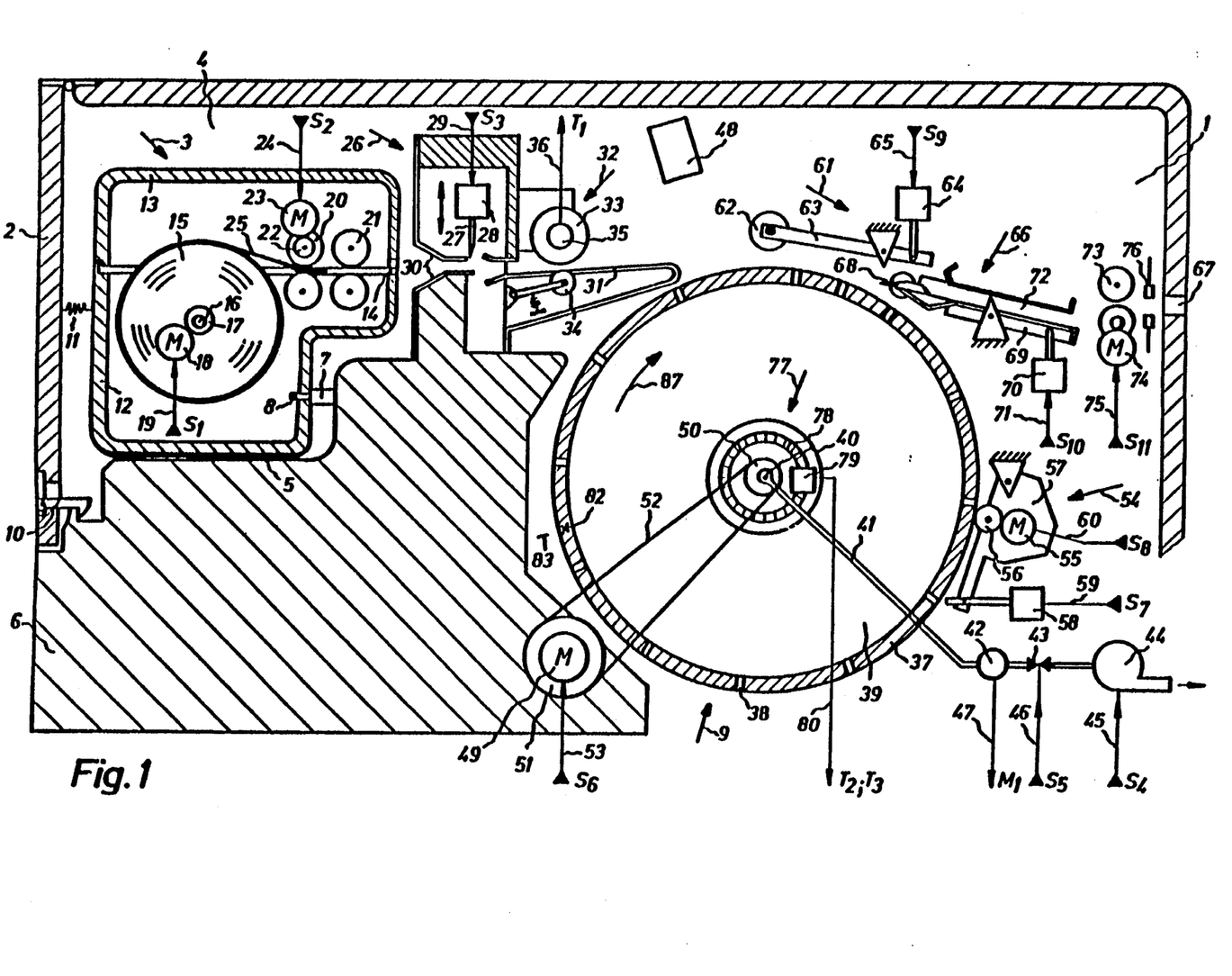
FIG. 1 shows in section the fundamental structure of a device for automatically clamping and releasing recording material onto or, respectively, from the recording drum of a color recorder shown in section.

As a sectional view, FIG. 1 shows the fundamental structure of a device for automatically clamping and releasing recording material onto or, respectively, from the recording drum of a color scanner. The recording drum, the dark room for the exposure and a part of the device carrier are shown.

At its left-hand side, the darkroom 1 of the color scanner comprises a loading flap 2 that closes in light-tight fashion. A roll film cassette 3 as a feeder cassette is inserted through the opened loading flap 2 into a cassette insertion compartment 4 of the color recorder and is deposited on an elevating platform 5 of the device carrier 6. With the assistance of centering pins 7 secured in the device carrier 6 and of corresponding centering bores 8 in the wall of the roll film cassette 3, the latter is exactly aligned vis-a-vis the device carrier 6 and vis-a-vis a recording drum 9 of the color recorder. After the loading flap 2 is closed and locked with the interlock 10, the roll film cassette 3 is pressed against the centering pins 7 by springs 11 and is fixed in the cassette insertion compartment 4. The roll film cassette 3, which is composed of a lower part 12 and of a removable cover 13 that closes light-tight, comprises a slot-shaped film passage opening 14.

Outside of the color scanner, the roll film cassette 3 was equipped with a film roll 15 of a given width through the opened cover 13 in that the hollow core of the film roll 15 was secured on a shaft 16 seated inside the roll film cassette 3. One end of the shaft 16 is conducted toward the outside through a bore in the wall of the roll film cassette 3 and is provided thereat with a drive wheel 17. After the roll film cassette 3 has been introduced into the cassette introduction compartment 4, the drive wheel 17 is coupled to a winding motor 18 that is stationarily secured to the device carrier 6 and that is controlled by a control signal $S_1$ on a line 19. A pair of film conveying rollers 20 and a pair of sealing rollers 21 are situated inside the roll film cassette 3 at the height of the film passage opening 14, respectively, one roller thereof being rotatably seated at the wall of the cover 13 and the other roller thereof being rotatably seated at the wall of the lower part 12. The shaft end of a roller of the pair of film conveying rollers 20 is conducted out of the roll film cassette 3 and is provided with a drive wheel 22 that is coupled to a stationary film conveying motor 23 when the roll film cassette 3 is introduced. The film conveying motor 23 is controllable with a control signal $S_2$ on a line 24. The pair of sealing rollers 21 seals the interior of the cassette from the film passage opening 14 in terms of light. The length of the pair of film conveying rollers 20, of the pair of sealing rollers 21 and of the film passage opening 14 corresponds to the maximum possible width of the film roll 15, which is in turn based on the structural length of the recording drum 9.

When equipping the roll film cassette 3, the start of the film roll 15 was threaded into the pair of film conveying rollers 20. The winding motor 18 additionally works as an electrical spring in that it generates a small counter-torque with respect to the torque of the film conveying motor 23 on the basis of permanent excitation, so that the film web 25 is always slightly tensioned between the pair of film conveyor rollers 20 and the film roll 15.

The clamping and releasing device also comprises a film cutting means 26 having a cutter blade 27 that is arranged in front of the film passage opening 14 of the roll film cassette 3 and is secured to the device carrier 6. The cutter blade 27 is actuated by a suitable adjustment element 28 that is controlled by a control signal $S_3$ on a line 29. The cutter blade 27 can be executed as a fly cutter that is lowered by the control element 28 or as a circular knife that is guided perpendicular to the film web 25 by the control element 28 and cuts the film web 25 across its width. The film web 25 is conveyed through the film cutting means 26 with the assistance of guide surfaces 30 and 31. The film cutting means 26 has the job of separating the film proof of a given length that is to be respectively clamped at the moment and exposed from the film web 25.

A film length measuring means 32 is provided following the film cutting means 26, the length of the film web 25 passing through being measured therewith. The film length measuring means 32 is composed of a measuring wheel 33, of a resiliently seated support wheel 34 and of a rotational pulse generator 35 coupled to the measuring wheel 33. The supporting wheel 34 projects through an opening in the guide surface 31 and presses the film web 25 against the measuring wheel 33 when it passes through. When the film web 25 is conveyed through the film length measuring means 32, the measuring wheel 33 executes a rotational motion that is transmitted onto the rotational pulse generator 35. The rotational pulse generator 35 generates a measurement clock sequence $T_1$ on a line 36 whose number of clocks is a measure for the length of the film web 25 that has passed through.

The recording drum 9 of the color recorder is rotatably seated at the device carrier 6 with shaft ends, this not being shown in greater detail. The recording drum 9 is a hollow cylinder 37 whose face ends are closed. The wall of the hollow cylinder 37 is provided with suction holes 38 that connect the drum surface to the interior 39 of the drum. One of the shaft ends is hollow, a vacuum channel arising as a result thereof that connects the interior 39 of the drum to a stationary suction line 41 via a vacuum connector 40 situated at the shaft end. The suction line 41 is connected to a vacuum pump 44 via a vacuum gauge 42 and a controllable secondary air valve 43. The vacuum pump 44 is switched on and off via a control signal $S_4$ on a line 45. A further control signal $S_5$ on a line 46 actuates the secondary air valve 43. The measured vacuum value is output by the vacuum gauge 42 as measured signal $M_1$ via a line 47.

The suction holes 38 are aligned in rows proceeding axially relative to the recording drum 9. The circumferential spacings of the suction hole rolls are expediently adapted to the standard format lengths of the film proofs to be clamped, i.e. the spacings of the suction hole rows are selected such that starts and ends of the film proofs of different formats respectively lie in the region of a suction hole row.

During the exposure of the clamped film proofs by a recording element 48, the recording drum 9 is driven by a main motor 49 via a belt drive that is composed of a pulley 50 connected to the recording drum 9, of a pulley 51 connected to the main motor 4 and of a belt 52. The main motor 49 is controlled by a control signal $S_6$ on a line 53.

A pivotable positioning drive 54 is present for positioning the recording drum 9 during the clamping and release of the film proofs. The positioning drive 54 is composed of an auxiliary motor 55 and of a frictional wheel 56 driven by the auxiliary motor 55. The auxiliary motor 55 and the frictional wheel 56 are mounted on a rotatably seated carrier plate 57 that can be positioned by a control element 58 such that the frictional wheel 56 either presses against the drum surface—as shown in FIG. 1—or is swivelled away therefrom. The control element 58 is actuated by a control signal $S_7$ on a line 59. The auxiliary motor 55 can be switched on and off by a further control signal $S_8$ on a line 60.

A pivotable pressure means 61 is provided for pressing the film proofs against the recording drum 9, this pressure means 61 being arranged in the region wherein the start of the film proof to be clamped respectively touches the drum surface. The pressure means 61 is composed of a pressure roller 62 that is rotatably seated at a lever 63 pivotable around a stationary pivot point and of a control element 64. The control element 64 that is activated by a control signal $S_9$ on a line 65 pivots the lever 63 such that the pressure roller 62 either presses against the drum surface or assumes the illustrated quiescent position.

For lifting the exposed film proofs off from the recording drum 9, a lift-off means 66 that is likewise pivotable is provided, this being arranged in the region of the darkroom 1 wherein the exposed film proofs are transported out of the darkroom 1 through a slot-shaped film exit opening 67. The lift-off means 66 comprises a lift-off finger 68 that is secured to a lever 69 pivotable around a stationary pivot point. The lever 69 can be pivoted such with a further control element 70 that the lift-off finger 68 enters into a circumferential groove (not visible) in the recording drum 9. The control element 70 is actuated by a control signal $S_{10}$ on a line 71.

The lift-off means 66 further comprises a guide channel 72 with the exposed film proofs that have been lifted off from the recording drum 9 with the lift-off finger 68 are guided to a pair of conveyor rollers 73 in the region of the film exit opening 67. The pair of conveyor rollers 73 that conveys the film proofs out of the darkroom 1 is driven by a conveyor motor 74 that is switched on and off by a control signal $S_{11}$ on a line 75.

Either a sleeve film cassette or the conveying channel of an external film developing station can be connected light-tight to the film exit opening 67 in order to collect the exposed film proofs conveyed through the film exit opening 67 or to immediately further-process them.

A light barrier 76 is arranged in the darkroom 1 preceding the film exit opening 67, the conveying of the exposed film proofs from the darkroom 1 being monitored with the assistance of this light barrier 76, the drive of the conveyor channel of the external developing station being potentially started therewith and the clamping of the next film proof being therewith enabled.

Before the clamping, the exposure and the release of the film proofs, the recording drum 9 must be turned into a defined circumferential position with the positioning drive 54. Such defined circumferential positions are the start of clamping position, the start of exposure position and the start of release position that shall be defined in greater detail in conjunction with the description of the function of the device with reference to FIGS. 2 through 7, and is also a reference position of the recording drum 9.

A position transmitter 77 that, for example, is composed of a grid disc 78 and of a stationary optoelectronic scanner 79 is provided for identifying the respective circumferential position of the recording drum 9. The scanner 79 generates one circumferential pulse $T_2$ on a line 80 per revolution of the recording drum 9 by scanning the grid disc 78 and generates a continuous count clock sequence $T_3$ whose number of clocks is a measure for the respective circumferential position of the recording drum 9.

In the reference position of the recording drum 9, a reference mark 82 secured to the recording drum 9 is coincident with a stationary reference mark 83. The grid disc 78 is adjusted such that the circumferential pulse $T_2$ is respectively output when the recording drum 9 is situated in the reference position.

The circumferential pulse $T_2$ and the counting clock sequence $T_3$ on the line 80 as well as the measuring clock sequence $T_1$ on the line 36 and the measured signal $M_1$ on the line 47 are supplied to a control circuit (not shown) wherein all control signals $S_1$ through $S_{11}$ are generated.

For defining the start of clamping position, the start of exposure position and the start of release position, the control circuit contains a plurality of position counters into which the counting clock sequence $T_3$ is counted and that are reset by the circumferential pulse $T_2$, so that the momentarily counted number of clocks during a revolution indicates the momentary circumferential position of the recording drum proceeding from the reference position.

The control circuit also contains a plurality of position memory registers into which the number of clocks corresponding to the start of clamping position, to the start of exposure position and to the start of release position are input and stored. The stored number of clocks and the number of clocks counted into the position counters are continuously compared to one another and appropriate signals that signalize when the respective circumferential positions are reached are generated given equality.

The control circuit further contains a plurality of length counters into which the measuring clock sequence $T_1$ are counted by the film length measuring means 32 and contains corresponding length memory registers wherein prescribed lengths are stored as numbers of clocks.

These stored numbers of clocks are in turn compared to the counted number of clocks of the measuring clock sequence $T_1$ in order to signal that the prescribed length has been reached.

The prescribed lengths are the respective length $L_1$ of the film proof to be cut off from the film web 25, the device-conditioned, constant spacing $L_2$ of the cutting point under the cutter blade 27 of the cutting means 26 from the measuring point under the measuring wheel 33 of the film length measuring means 32 in the plane of the film web, the distance $L_3$—likewise constant—from the measuring point to a clamping mark on the recording drum 9 when this is situated in the clamping position, as well as the length $L_4$ of a film loop to be formed.

The structure of the device having been set forth with reference to FIG. 1, the operation of the device in the individual phases of clamping and releasing the film proofs shall now be set forth in greater detail with reference to FIGS. 2 through 7.

Figure 2:
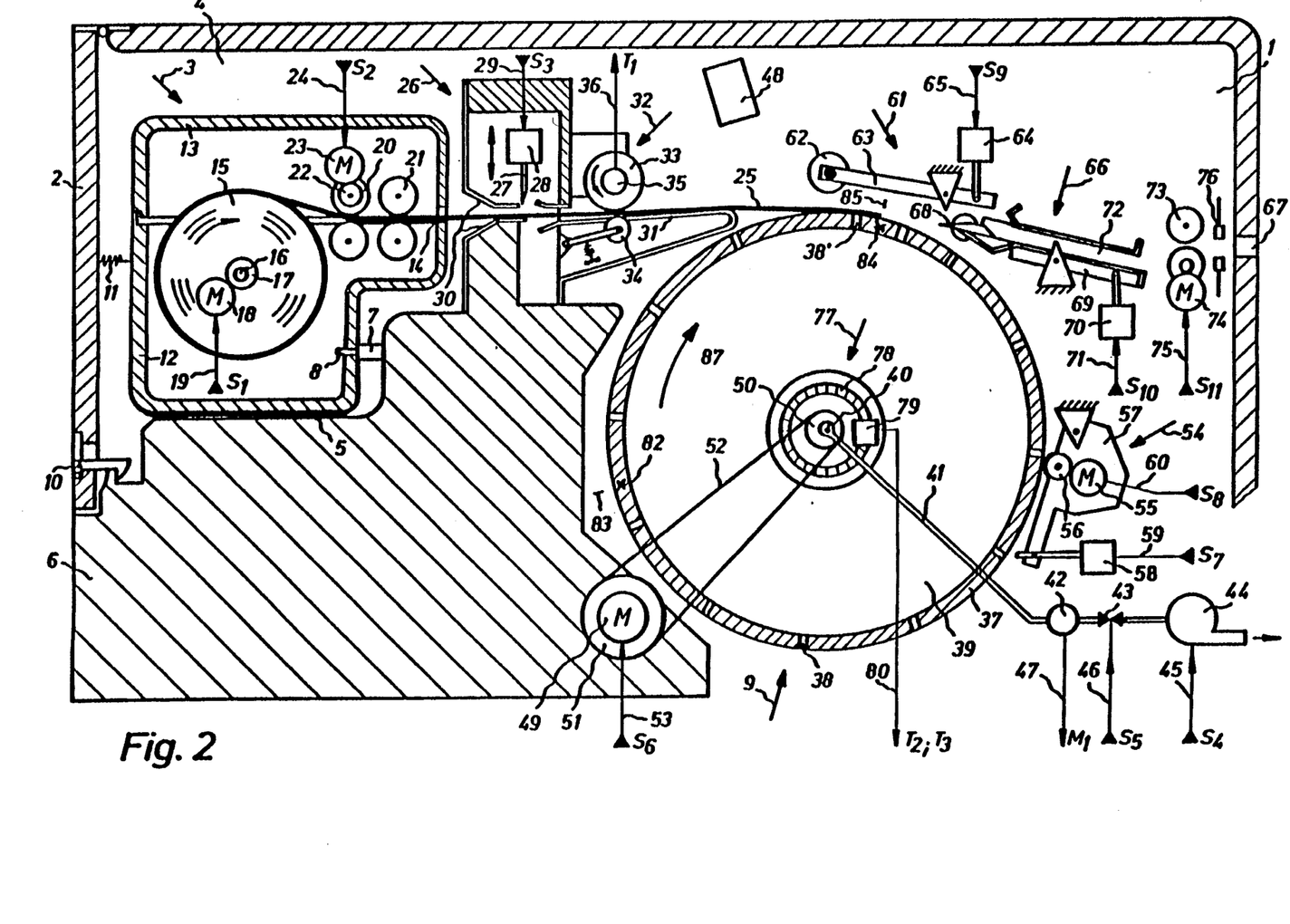
FIG. 2 illustrates the beginning of the clamping process, whereby the recording drum is situated in a start of clamping positions.

After the length $L_1$ of the film proof to be momentarily cut from the film web 25 or to be momentarily exposed has been input into the corresponding length memory register of the control circuit, the recording drum 9 is first turned into the start of clamping position with the assistance of the positioning drive 54 and the film web 25 is conveyed up to a clamping mark 84 of the recording drum 9, this being shown in FIG. 2.

The clamping mark 84 marks that generated line of the recording drum 9 on which the start of the film web 25 conveyed to the recording drum 9 should respectively lie. This clamping mark 84 is expediently applied in the proximity of a suction hole row 38', so that the starting region of the film web 25 respectively lies over the suction hole row 38' and is suctioned against the drum surface.

In the start of clamping position of the recording drum 9, the clamping mark 84 is in coincidence with an imaginary, stationary reference mark 85. The start of clamping position is selected such that the clamping mark 84 lies in the region of the pressure roller 62 wherein the start of the film web 25 guided by the guide surface 31 to the recording drum 9 comes into contact with the drum surface.

In order to turn the recording drum 9 into this start of clamping position, the auxiliary motor 55 is started by the control signal $S_8$ on the line 60, the circumferential position is identified with the position transmitter 77, and the auxiliary motor 55 is in turn stopped when the start of clamping position is reached. The frictional wheel 56 of the positioning drive 55 remains swivelled in in order to retain the recording drum 9 in the start of clamping position.

Subsequently, the film conveying motor 23 is switched on by the control signal $S_2$ on the line 24 and the film web 25 is conveyed via the guide surface 31 to the recording drum 9, being conveyed with the pair of film conveying rollers 22 through the pair of sealing rollers 21, the film cutting means 26 and the film length measuring means 32. When the start of the film web 25 enters into the film length measuring means 32, the latter begins to measure the film length that has run through. When the measured length of the film web 25 is equal to the constant spacing $L_3$ between measuring point and clamping mark 84 on the recording drum 9, the film conveying motor 23 is stopped. As shown in FIG. 2, the start of the film web 25 is then situated at the clamping mark 84 and the starting region of the film web 25 is situated over the suction hole row 38'.

Figure 3:
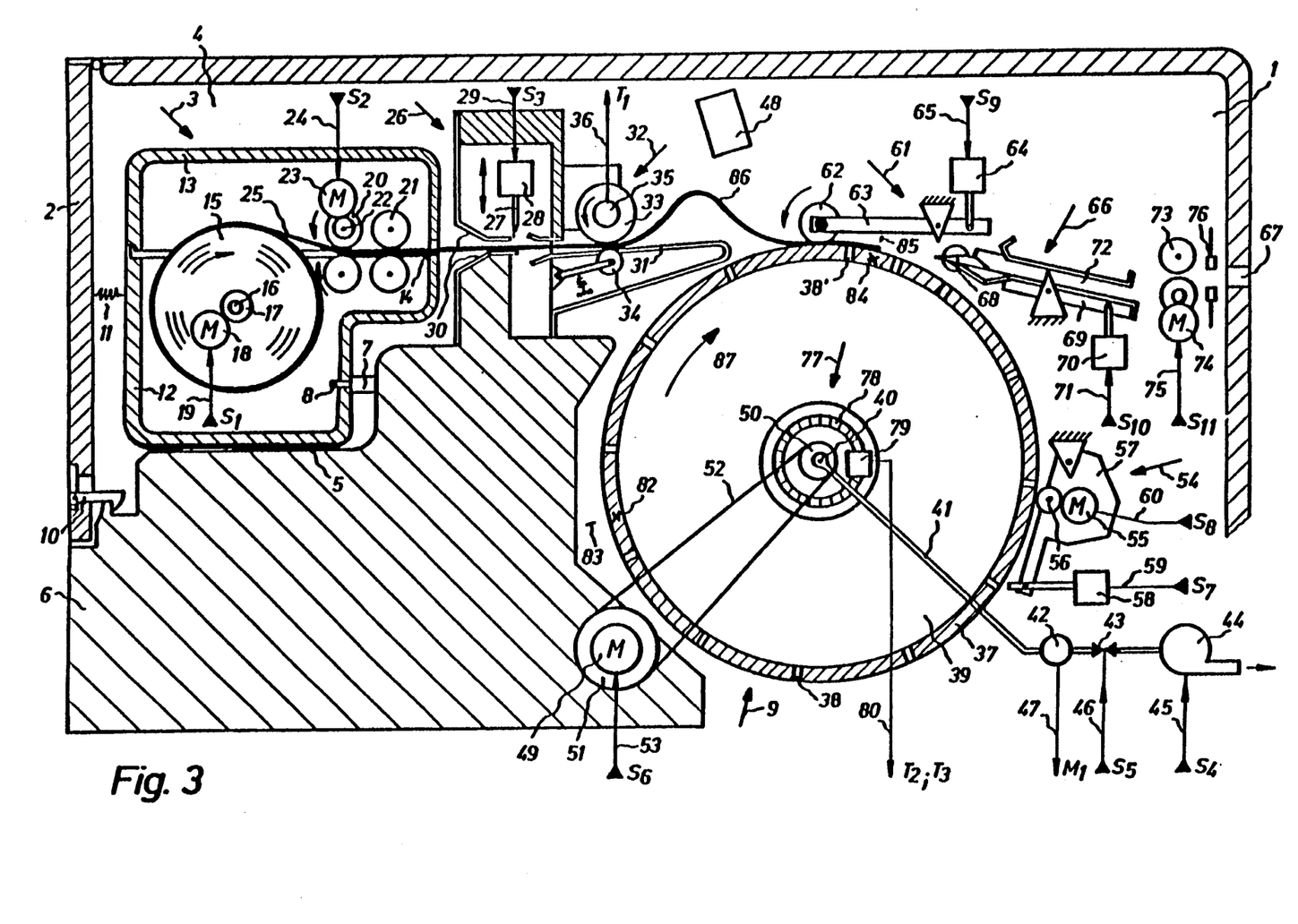
FIG. 3 shows the clamping process at a time at which a film loop is formed.

After the conveying of the film web 25 to the clamping mark 84, the pressure roller 62 of the pressure means 61 is lowered by the control signal $S_9$ on the line 65, as shown in FIG. 3, as a result whereof the starting region of the film web 25 is pressed against the drum surface. The vacuum is now built up by switching on the vacuum pump 44 with the control signal $S_4$ on the line 45 and the starting region of the film web 25 is fixed on the drum surface by the vacuum. The secondary air valve 43 is thereby closed, so that the vacuum takes effect with its full nominal value. Reaching the full nominal value is checked with the assistance of the vacuum gauge 44 in that the measured signal $M_1$ on the line 47 is compared to a rated nominal value in the control circuit.

If it should turn out when measuring the vacuum that the nominal vacuum value was not reached, the prior execution is reversed in that the pressure roller 62 is lifted off, the vacuum is shut off and the film web 25 is conveyed back into the roll film cassette 3 with the assistance of the film conveying motor 23 until the start of the film web 25 has reached the position between the pair of film conveying rollers 22 shown in FIG. 1, When rewinding the film web 25 into the roll film cassette 3, the winding motor 18 is simultaneously started by the control signal $S_1$ on the line 19, this winding motor 18 in turn rewinding the returned film web 25 onto the film roll 15.

When it has found when checking the vacuum that the full nominal value of the vacuum has been reached, a film loop 86 begins to form in the film web 25 in that the film conveying motor 23 is re-started and another section of the film web 25 is conveyed out of the roll film cassette 3. Since the vacuum and the pressure roller 62 retain the start of the film web 25 on the recording drum 9 stopped in the start of clamping position, the film web 25 backs up and forms the film loop 86. The length of the film web 25 conveyed during the formation of the loop is measured by the film length measuring means 32 and the film conveying motor 23 is in turn stopped when the measured length coincides with the length $L_4$ of the film loop 86 previously input into the control circuit. At this point in time, the film length measuring means 32 has measured a film length of $L_3+L_4$.

After the formation of the film loop 86, the secondary air valve 43 is opened by the control signal $S_5$ on the line 46 and the vacuum is lowered to a reduced value. The reduced vacuum is also measured with the vacuum gauge 42 and is compared to a reduced, rated nominal value. If it turns out that the reduced vacuum was not reached, the prior execution—as already set forth—is likewise reversed and the film web 25 is conveyed back into the roll film cassette 3.

Figure 4:
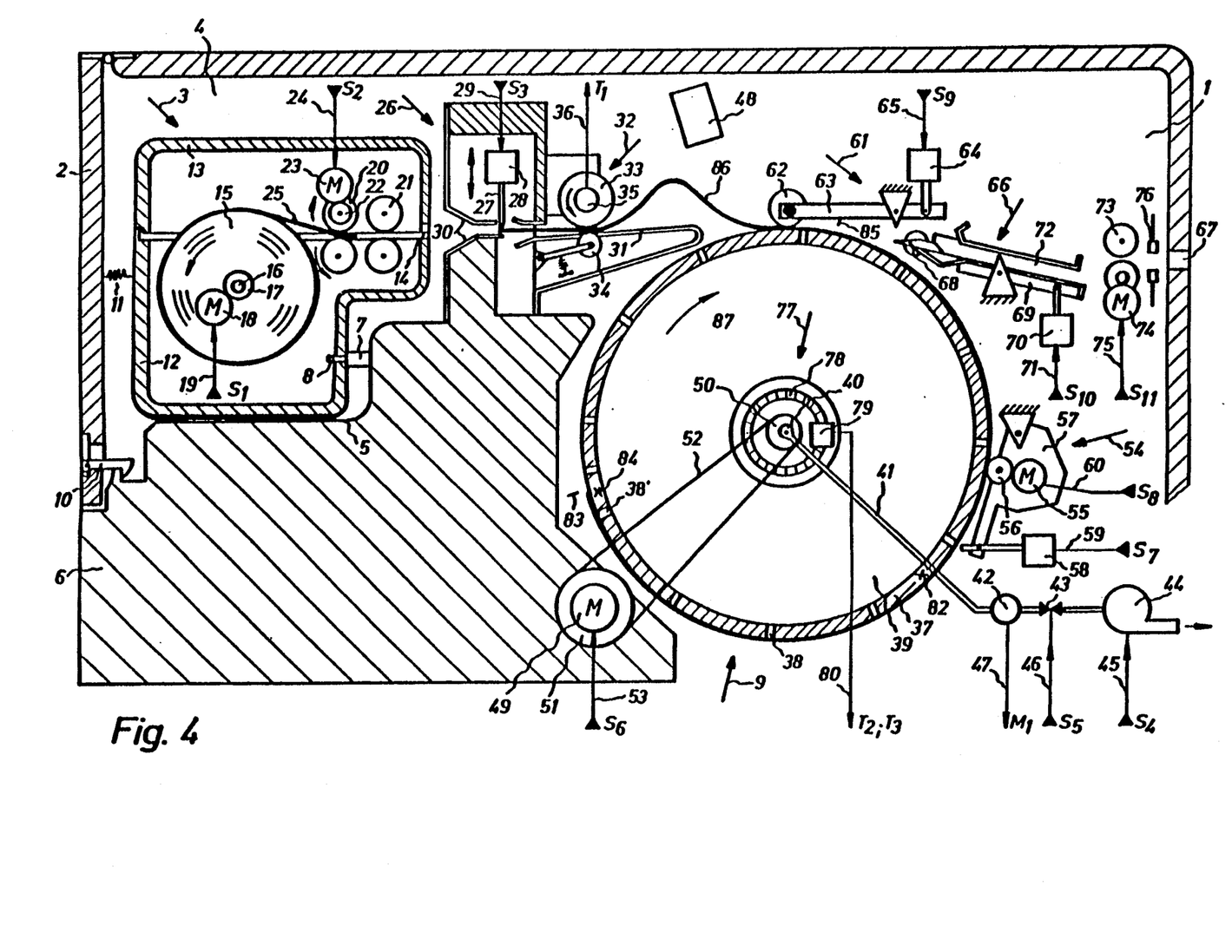
FIG. 4 shows the clamping process after a film proof has been cut off from a film web.

When the reduced, rated nominal value for the vacuum has been reached, the process of clamping the film web 25 or, respectively, the film proof 25' onto the recording drum 9 begins after the cutting event, as shown in FIG. 4.

The auxiliary motor 55 of the positioning drive 54 is started by the control signal $S_8$ on the line 60 and the film conveying motor 23 is started by the control signal $S_2$ on the line 24. By turning the recording drum 9 in the direction of an arrow 87, the film web 25 places itself around the recording drum 9, whereby that part of the film web 25 corresponding to the respective wrap is fixed on the drum surface by the suction hole rows. The rotational speed of the recording drum 9 and the conveying speed of the film web 25 are matched such to one another that the size of the film loop 86 is approximately maintained during clamping.

During clamping, the film conveying motor 23 continues to feed the film web 25 until the film length measuring means 32 has identified an overall film length passing through that corresponds to the previously input length $L_1$ of the film proof to be clamped minus the constant spacing $L_4$ between cutting point and measuring point. At this time, the end of the film proof 25' to be cut off from the film web 25 is situated in the cutting point under the cutter blade 27 of the film cutting means 26. The film conveying motor 23 and the auxiliary motor 55 of the positioning drive 54 are stopped and the film proof 25' is cut off from the film web 25 by the cutter blade 27 on the basis of the control instruction $S_3$ on the line 29. After the film cut, the film conveying motor 23 runs in the opposite rotational sense and conveys the film web 25 back into the roll film cassette 3 until the cut edge—as shown in FIG. 4—lies between the pair of film conveying rollers 22, the film web 25 having thus been prepared for another clamping process.

After the film cut, the auxiliary motor 55 of the positioning drive 54 is also restarted and the recording drum 9 continues to turn in the direction of the arrow 87 until the entire film proof 25' is clamped, whereby the clamped film proof 25' is fixed on the drum surface by the reduced vacuum.

The film loop 86 achieves a decoupling of the film conveying from the rotational motion of the recording drum. Drunkenness of the roll film cassette, crooked clamping of the film proof 25' on the recording drum 9 as well as warping and the formation of folds within the film proof 25' being advantageously prevented as a result thereof. Added thereto is that the starting region of the film proof 25' is stiffened by the film loop 86, so that a reliable fixing of the starting region is guaranteed. As a result of reducing the vacuum during the clamping, the tendency of the film proof to form folds and to run at a slant is further reduced and a tension-free clamping is guaranteed.

Figure 5:
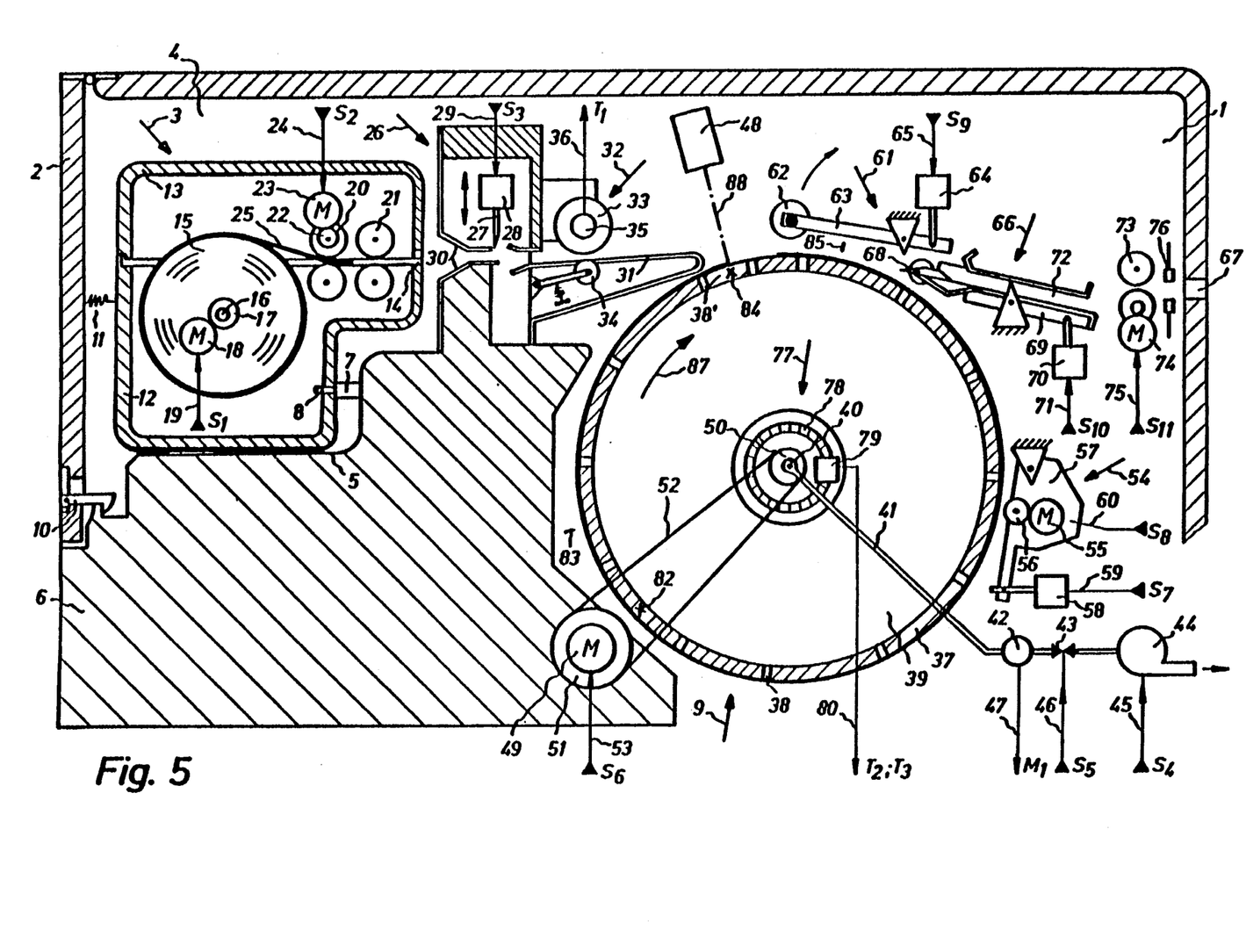
FIG. 5 illustrates the clamping process when fixing the cutoff film proof onto the recording drum.

When the recording drum 9 is situated in the start of exposure position, as shown in FIG. 5, the auxiliary motor 55 of the positioning drive 54 is stopped. In the start of exposure position, the clamping mark 84 at the recording drum 9 is situated in the optical axis 88 of the recording element 48. In the start of exposure position of the recording drum 9, the frictional wheel 56 of the positioning drive 54 and the pressure roller 62 of the pressing means 61 are lifted off from the surface of the recording drum 9 by the control signals $S_8$ and $S_9$ on the lines 60 and 65. At the same time, the vacuum is boosted to the full nominal value by closing the secondary air valve 43 with the control signal $S_5$ on the line 46. When the monitoring of the vacuum with the vacuum gauge 42 shows that the nominal value has in fact been reached, the main motor 49 starts as a result of the control signal $S_6$ on the line 53 and turns the recording drum 9 during the exposure of the clamped film proof 25' by the recording element 48.

Figure 6:
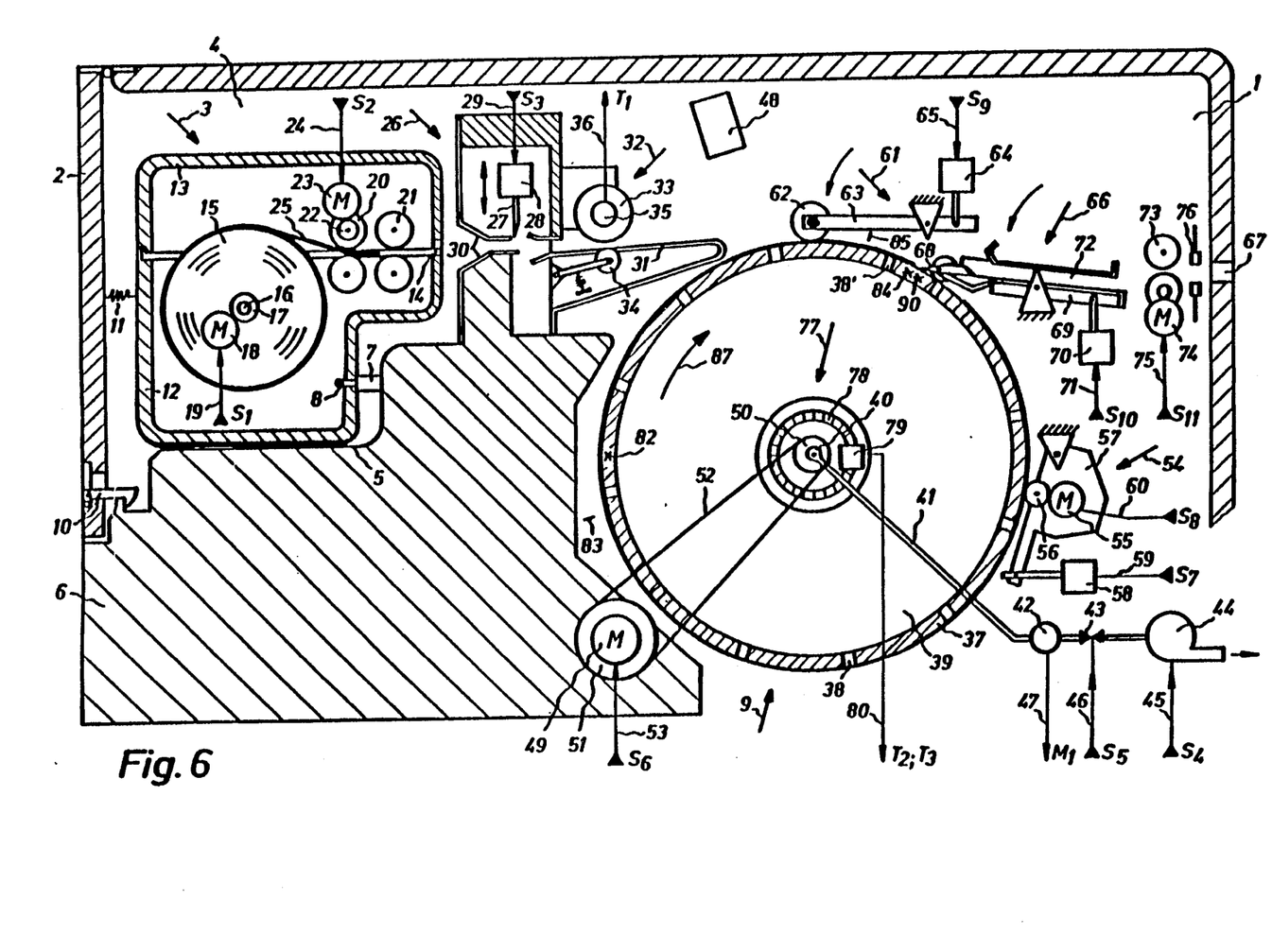
FIG. 6 shows the beginning of the release process, whereby the recording drum is situated at a start of a release position.

The release process that is shown in FIG. 6 is initiated after the exposure of the film proof 25' and deceleration of the recording drum 9.

The frictional wheel 56 of the positioning drive 54 is again lowered onto the surface of the recording drum 9 by the control instruction $S_7$ on the line 59; the auxiliary motor 55 of the positioning drive 54 is switched on by the control signal $S_8$ on the line 60; and the recording drum 9 is turned in the direction of the arrow 87 into the start of release position. A fixed release mark 90 is situated at the recording drum 9 in the start of release position under the tip of the lift-off finger 68 of the lift-off means 66. The release mark 90 lies in that region of the drum surface that dare not be covered by the clamped film proof 25' so that the lift-off finger 68 can reliably enter into the circumferential groove (not shown) of the recording drum 9 between the start and end of the clamped film proof 25'. Deriving therefrom is the demand that the maximally possible length of a film proof 25' to be clamped on must be shorter by the said region than the circumferential length of the recording drum 9. The start of release position is assumed independently of the respective length of the clamped film proof 25'.

Figure 7:
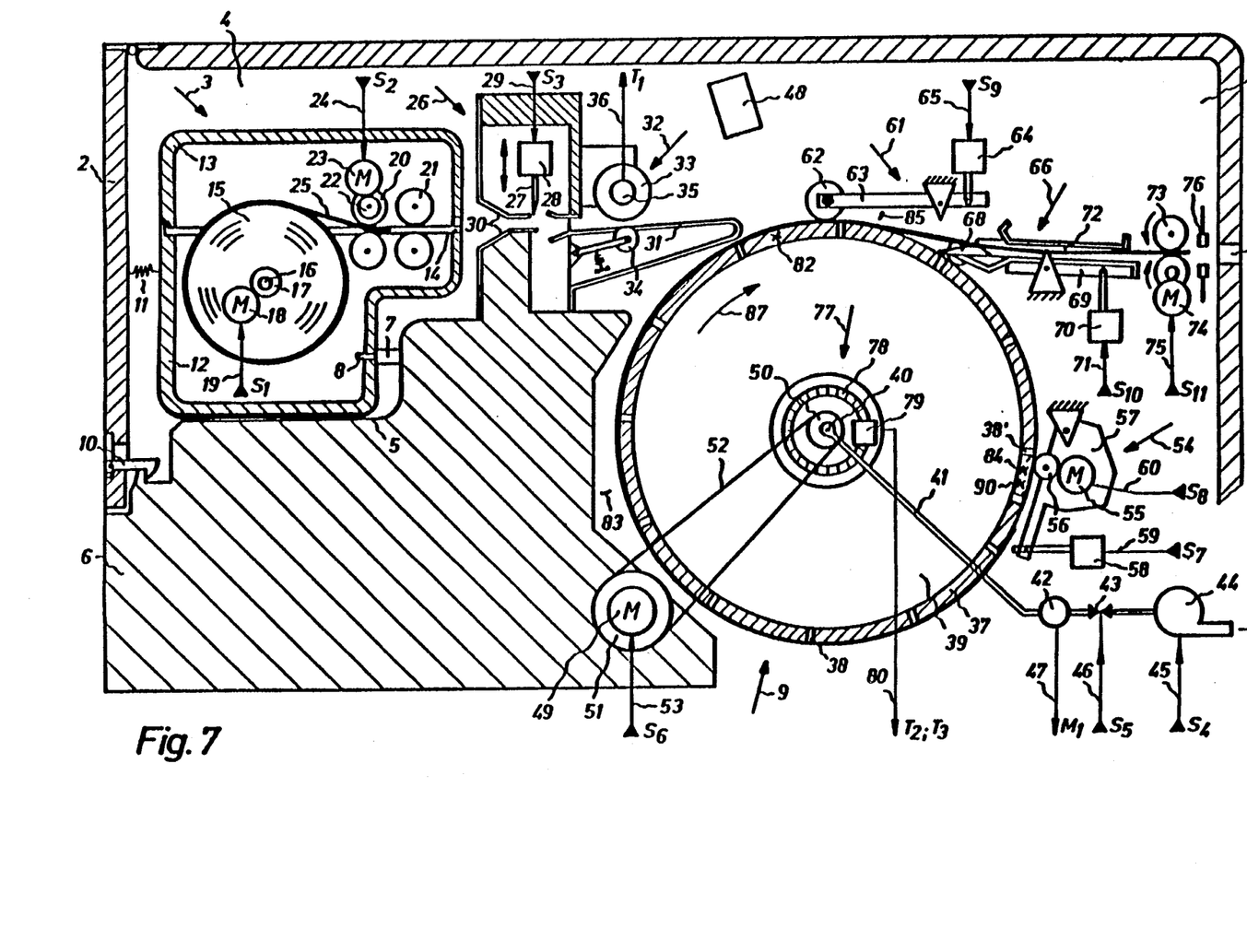
FIG. 7 illustrates the release process when stripping the exposed film proof from the recording drum.

In the start of release position, the pressure roller 62 of the pressure means 61 is lowered by the control signal $S_9$ on the line 65 and the lift-off finger 68 of the lift-off means 66 is lowered by the control signal $S_{10}$ on the line 71, as shown in FIG. 6, and the conveyor motor 74 is started by the control signal $S_{11}$ on the line 75 and the pair of film conveying rollers 73 is thereby placed in rotation. Subsequently, the auxiliary motor 55 of the positioning drive 54 is again started by the control signal S₈ on the line 60 and the recording drum 9 is turned farther in the direction of the arrow 87. Due to the rotation of the recording drum 9, the lift-off finger 68 peels the exposed film proof 25' from the drum surface under full vacuum. Due to the rotation of the recording drum 9, the exposed film proof 25'—as shown in FIG. 7—is pushed through the guide channel 72 of the lift-off means 66 until it is seized by the pair of conveyor rollers 73 and is conveyed out of the darkroom 1 through the film exit opening 67. The conveyor motor 74 is equipped with a free wheel with which a speed matching between the rotational motion of the recording drum 9 and of the rotational motion of the pair of film conveying rollers 73 is advantageously undertaken.

Although various minor changes and modifications might be proposed by those skilled in the art, it will be understood that we wish to include within the claims of the patent warranted hereon all such changes and modifications as reasonably come within out contribution to the art.

We claim:

1. An apparatus for automatically clamping a film web onto a recording drum of a reproduction device and for releasing an exposed film sheet recorded by a recording element from the recording drum, the recording drum being situated in a substantially light-tight space of the reproduction device, comprising:

a light-tight roll film cassette that contains the film web as a rotatable film roll, said roll film cassette being provided with a slot-shaped film passage opening and light sealing means associated with the opening for providing a substantially light-tight environment in the cassette, said light sealing means comprising sealing rollers arranged above and below the film web, a length of said sealing rollers at least corresponding to a length of said film passage opening, said light-tight roll film cassette being positioned into the light-tight space of said reproduction device and being locked there, the film passage opening being positioned to open toward the recording drum and having a longitudinal extent which is parallel to an axis of the recording drum;

a film conveying means arranged in said roll film cassette for conveying the film web out of the roll film cassette means to the recording drum, said film conveying means comprising conveyor rollers, at least one of said conveyor rollers being driven by a film conveying motor;

a film winding means arranged in said roll film cassette for conveying unwound film web back into said roll film cassette and for winding it up onto the film roll;

a conveying and guide surface arranged between the film passage opening and the recording drum for receiving the film unwound from the roll film cassette and for conveying and positioning the unwound film substantially tangent relative to the recording drum;

a film length measuring means arranged between the roll film cassette and the recording drum for identifying a length of the film web that has respectively passed through;

film cutting means arranged between the roll film cassette and the recording drum for cutting a film sheet of a prescribed length from the film web to be respectively exposed;

a pressure roller which is pivotable against the recording drum at a region where a start of the film web conveyed to the recording drum comes into contact with a surface of the recording drum;

a positioning drive for rotating the recording drum into a start of clamping position, a start of exposure position, and a start of release position;

a lift-off finger pivotable against the recording drum for peeling a respectively exposed film sheet from the recording drum;

rows of suction holes in a surface of the recording drum which are arranged in an axial direction of said recording drum and which are connected by a suction line to a vacuum pump for vacuum-fixing of the film sheet on the recording drum;

a controllable air valve inserted in said suction line for reducing a vacuum during the clamping and the release of the film web and film sheet respectively; and the film length measuring means comprises a measuring wheel driven by motion of the film web, a supporting wheel resiliently pressing the film web against the measuring wheel, and a rotational pulse generator coupled to the measuring wheel, said rotational pulse generator converting a rotation of the measuring wheel into a clock sequence such that a number of clocks is a measure of measured film length.

2. An apparatus according to claim 1 wherein circumferential spacings of said rows of suction holes are adapted to lengths of standard formats of film sheets to be clamped on the recording drum.

3. An apparatus according to claim 1 wherein a vacuum gauge for outputting an electrical signal is inserted into said suction line for vacuum monitoring said vacuum-fixing.

4. An apparatus according to claim 1 wherein said recording drum comprises a first circumferential mark as a clamping mark identifying a positional line of the recording drum on which a beginning of a film sheet to be clamped on is respectively fixed on the recording drum at said start of clamping position.

5. An apparatus according to claim 1 wherein said recording drum comprises a second circumferential mark as a release mark identifying a positional line of the recording drum on which the lift-off finger is respectively lowered onto the recording drum at said start of release position.

6. An apparatus according to claim 1 wherein
   a maximum length of film sheet which can be clamped on is less than a circumferential length of the recording drum; and
   a circumferential mark as a release mark is arranged in a jacket region of the recording drum not covered by the film sheet of maximum length clamped on the recording drum.

7. An apparatus according to claim 1 wherein a shaft of the recording drum is connected to a position transmitter for marking said start of clamping position, said exposure position, and said start of release position.

8. An apparatus for automatically clamping a film web onto a recording drum of a reproduction device and for releasing an exposed film sheet recorded by a recording element from the recording drum, the recording drum being situated in a substantially light-tight space of the reproduction device, comprising:

a light-tight roll film cassette that contains the film web as a rotatable film roll, said roll film cassette being provided with a slot-shaped film passage opening and light sealing means associated with the opening for providing a substantially light-tight environment in the cassette, said light sealing means comprising sealing rollers arranged above and below the film web, a length of said sealing rollers at least corresponding to a length of said film passage opening, said light-tight roll film cassette being positioned into the light-tight space of said reproduction device and being locked there, the film passage opening being positioned to open toward the recording drum and having a longitudinal extent which is parallel to an axis of the recording drum;

a film conveying means arranged in said roll film cassette for conveying the film web out of the roll film cassette means to the recording drum, said film conveying means comprising conveyor rollers, at least one of said conveyor rollers being driven by a film conveying motor;

a film winding means arranged in said roll film cassette for conveying unwound film web back into said roll film Cassette and for winding it up onto the film roll;

a conveying and guide surface arranged between the film passage opening and the recording drum for receiving the film unwound from the roll film cassette and for conveying and positioning the unwound film substantially tangent relative to the recording drum;

a film length measuring means arranged between the roll film cassette and the recording drum for identifying a length of the film web that has respectively passed through;

film cutting means arranged between the roll film cassette and the recording drum for cutting a film sheet of a prescribed length from the film web to be respectively exposed;

a pressure roller which is pivotable against the recording drum at a region where a start of the film web conveyed to the recording drum comes into contact with a surface of the recording drum;

a positioning drive for rotating the recording drum into a start of clamping position, a start of exposure position, and a start of release position;

a lift-off finger pivotable against the recording drum for peeling a respectively exposed film sheet from the recording drum;

rows of suction holes in a surface of the recording drum which are arranged in an axial direction of said recording drum and which are connected by a suction line to a vacuum pump for vacuum fixing of the film sheet on the recording drum;

a controllable air valve inserted in said suction line for reducing a vacuum during the clamping and the release of the film web and film sheet respectively; and means for generating a counter-torque with respect to a torque of the film conveying motor by constant excitation of said winding motor in order to tense the film web between the film roll and the conveyor rollers of said film conveying means within said roll film cassette.

9. An apparatus for automatically clamping a film web onto a recording drum of a reproduction device and for releasing an exposed film sheet recorded by a recording element from the recording drum, the recording drum being situated in a substantially light-tight space of the reproduction device, comprising:

a light-tight roll film cassette that contains the film web as a rotatable film roll, said roll film cassette being provided with a slot-shaped film passage opening and light sealing means associated with the opening for providing a substantially light-tight environment in the cassette, said light sealing means comprising sealing rollers arranged above and below the film web, a length of said sealing rollers at least corresponding to a length of said film passage opening, said light-tight roll film cassette being positioned into the light-tight space of said reproduction device and being locked there, the film passage opening being positioned to open toward the recording drum and having a longitudinal extent which is parallel to an axis of the recording drum;

a film conveying means arranged in said roll film cassette for conveying the film web out of the roll film cassette means to the recording drum, said film conveying means comprising conveyor rollers, at least one of said conveyor rollers being driven by a film conveying motor;

a film winding means arranged in said roll film cassette for conveying unwound film web back into said roll film cassette and for winding it up onto the film roll;

a conveying and guide surface arranged between the film passage opening and the recording drum for receiving the film unwound from the roll film cassette and for conveying and positioning the unwound film substantially tangent relative to the recording drum;

a film length measuring means arranged between the roll film cassette and the recording drum for identifying a length of the film web that has respectively passed through;

film cutting means arranged between the roll film cassette and the recording drum for cutting a film sheet of a prescribed length from the film web to be respectively exposed;

a pressure roller which is pivotable against the recording drum at a region where a start of the film web conveyed to the recording drum comes in contact with a surface of the recording drum;

a positioning drive for rotating the recording drum into a start of clamping position, a start of exposure position, and a start of release position;

a lift-off finger pivotable against the recording drum for peeling a respectively exposed film sheet from the recording drum;

rows of suction holes in a surface of the recording drum which are arranged in an axial direction of said recording drum and which are connected by a suction line to a vacuum pump for vacuum-fixing of the film sheet on the recording drum;

a controllable air valve inserted in said suction line for reducing the clamping and the release of the film web and film sheet respectively;

said roll film cassette being formed of a lower part and of a removable cover part that closes light-tight; and one roller of a pair of sealing rollers and one roller of a pair of conveyor rollers being seated in the lower part and the other roller of each pair of rollers being respectively seated in the cover of said roll film cassette.

10. A method for automatically clamping a film web onto a recording drum of a reproduction device and for release of an exposed film sheet recorded by a recording element from the recording drum, the recording drum being situated in a substantially light-tight space of the reproduction device, and a generated surface of the recording drum having rows of suction holes that are connected by a suction line to a vacuum pump in order to fix the film on the recording drum, comprising the steps of:

loading a roll film cassette with a film roll outside the reproduction device, bringing the cassette into the light-tight space of the reproduction device and depositing on an elevating platform and locking it there;

turning the recording drum with a positioning drive to a start of clamping position in which a clamping mark on the recording drum is situated in a region of a pressure roller of a pressure means and in a region of a suction hole row, whereby the clamping mark makes a generated line of the recording drum on which a start of a film sheet to be clamped on should lie on the recording drum;

starting a film conveying means and unwinding the film web from the film roll of the roll film cassette and conveying it to the recording drum via a conveying and guide surface;

measuring the length of the film web which passes through a film length measuring means and constantly comparing the measured film length to a constant spacing between the film length measuring means and the clamping mark at the start of clamping position of the recording drum, and stopping film conveying means given equality, whereby a start of the film web is situated on the clamping mark;

lowering a pressure roller of a pressure means onto the recording drum and pressing the start of the film web against the recording drum;

switching on the vacuum pump and fixing the start of the film web on the recording drum by the suction hole row;

again starting the film conveying means, conveying out additional film web from the roll film cassette and forming a film loop at a starting region of the film web by feeding the film web;

measuring a length of the additionally conveyed film web with the film length measuring means and comparing the measured film length to a prescribed length for the film loop, and, given equality, again stopping the film conveying means;

starting the positioning drive for turning the recording drum and the film conveying means and conveying the additional film web to the recording drum where it is clamped onto the rotating recording drum, whereby speeds of the film conveying means and of the positioning drive are matched to one another such that the film loop is approximately maintained;

when clamping the film web, continuing the measurement of the film web length in the film length measuring means proceeding from the film length previously measured, and a momentarily measured film length is compared to the prescribed length for the film sheet to be respectively clamped on taking the constant spacing between the film length measuring means and the film cutting means into consideration and, given equality, the film conveying means and the positioning drive are stopped, whereby an end of the film sheet to be cut off from the film web lies under the film cutting means;

separating the film sheet of prescribed length to be clamped on from the film web with the film cutting means, and conveying the film web back into the roll film cassette by starting the film conveying means and the winding motor so as to wind onto the film roll;

again starting the positioning drive, a remaining part of the film sheet being clamped onto the recording drum, and again stopping the positioning drive when the recording drum is situated at a start of exposure position wherein the clamping mark is situated at an optical axis of the recording element;

lifting the positioning drive and the pressure roller of the pressure means off from the recording drum at the start of exposure position of the recording drum;

switching on a main motor for rotation of the recording drum and exposing the film sheet clamped on the rotating recording drum point-by-point and line-by-line with the recording element;

after the exposure of the film sheet, stopping the main motor and again pivoting the positioning drive against the recording drum and starting it;

turning the recording drum by the positioning drive into a start of release position marked by a release mark and wherein a lift-off finger of a lift-off means which lies on the generated line of the recording drum is lowered onto the recording drum;

at the start of release position, lowering a pressure roller of a pressure means and lowering the lift-off finger of the lift-off means onto the recording drum and starting a conveying motor for a pair of film conveying rollers; and starting the positioning drive and peeling the exposed film sheet from the drum surface by the lowered lift-off finger and conveying it to the pair of conveying rollers due to the rotation of the recording drum and conveying it out of the reproduction device through a film exit opening of the light-tight space by said pair of conveyor rollers.

11. A method according to claim 10 including the step of lowering a nominal value of the vacuum provided during exposure to a reduced nominal value by opening an air valve in said suction line for a duration of clamping, as a result whereof the film sheet is suctioned on with reduced under-pressure.

12. A method according to claim 11 including the steps of:

measuring the nominal value and the reduced nominal value for the vacuum with a vacuum gauge;

comparing actual values of the measured nominal values with rated values; and when the measured nominal values do not reach the rated values, reversing operation hitherto implemented in order to convey the film web back into the roll film cassette.

13. A method according to claim 10 including the steps of:

loading the roll film cassette outside the reproduction device;

bringing the roll film cassette into the light-tight space of the reproduction device; and then lowering the roll film cassette onto an elevating platform and locking it there.

14. A method according to claim 10 including the steps of:
measuring a length of the film web that passes through the film length measuring means;
constantly comparing the measured film length to a constant spacing between the film length measuring means and a clamping mark at the start of clamping position of the recording drum; and
stopping the film conveying means given equality;
whereby the start of the film web is situated on the clamping mark.

15. A method for automatically clamping a film sheet onto a recording drum of a reproduction device and for release of the film sheet from the recording drum, comprising the steps of:
providing a film cassette containing a roll of film;
providing rows of suction holes in the recording drum, including at a beginning position where a leading end of the film sheet is to be clamped;
turning the recording drum with a positioning drive to the beginning position;
unwinding film from the film roll and conveying it to the drum;
lowering the pressure roller onto the film at the recording drum at the beginning position and switching on a vacuum at least at the suction hole row at the beginning position;
forming a film loop between the recording drum and the film cassette;
rotating the drum and winding the film thereon while maintaining said film loop;
cutting the film at a desired end of an individual film sheet to be cut off and winding the remainder of the film sheet onto the drum; and
removing the film sheet from the drum with a lift-off finger as the recording drum rotates.

* * * * *